United States Patent [19]
Paine

[11] 3,826,478
[45] July 30, 1974

[54] CUTTING APPARATUS
[75] Inventor: Anthony Alan Paine, St. Albans, England
[73] Assignee: National Research Development Corporation, London, England
[22] Filed: Sept. 20, 1972
[21] Appl. No.: 290,736

[30] Foreign Application Priority Data
Sept. 23, 1971 Great Britain............... 44459/71

[52] U.S. Cl. .......... 266/23 R, 266/23 B, 266/23 K, 266/23 HH
[51] Int. Cl. ........................ B23k 5/00, B23k 7/00
[58] Field of Search .. 266/23 R, 23 B, 23 K, 23 HH

[56] References Cited
UNITED STATES PATENTS

| | | | |
|---|---|---|---|
| 1,342,502 | 6/1920 | Hasse | 266/23 HH |
| 2,312,120 | 2/1943 | Paddon | 266/23 HH |
| 2,345,688 | 4/1944 | Smith | 266/23 HH |
| 2,879,055 | 3/1959 | Johnston | 266/23 B |
| 3,558,117 | 1/1971 | Hess | 266/23 R |
| 3,704,012 | 11/1972 | Pfeuffer et al. | 266/23 K |
| 3,713,637 | 1/1973 | Cable et al. | 266/23 K |

Primary Examiner—Harrison L. Hinson
Attorney, Agent, or Firm—Cushman, Darby & Cushman

[57] ABSTRACT

Cutting apparatus, especially for cutting steel joists, reinforced concrete beams and the like in the demolition of buildings. The cutter carries a locating device that may be located upon the joist by remote control, e.g. by the jib of a crane, and once located the cutter is driven around a cutting path appropriate for the severing of the joist. A modified apparatus has two burners, one to either side of the locating device, so that one cutting operation may sever a chosen length of joist, and the central locating device may be positive enough to hold the severed length in the apparatus.

6 Claims, 7 Drawing Figures

CUTTING APPARATUS

This invention relates to cutting apparatus, and in particular to apparatus of the torch or jet type suitable for cutting girders and other steel-based members in building demolition work. Today such cutting operations usually require a man to climb up to the member concerned and address an oxy-acetylene or similar torch to it by hand. The operator is often in some danger when climbing up to the member, when climbing down again, and when the member is severed and falls, often in a direction that cannot be guaranteed.

There is a need for cutting apparatus that can be set up adjacent the member, and can then be caused to execute a cutting operation, by remote control. There is particular need for apparatus that will hold the member after severance so that apparatus and member can be recovered together in safety.

Our invention includes new methods of severance and recovery, is defined by the claims at the end of this specification, and will now be described by way of example with reference to the accompanying drawings in which:

Figure 1:
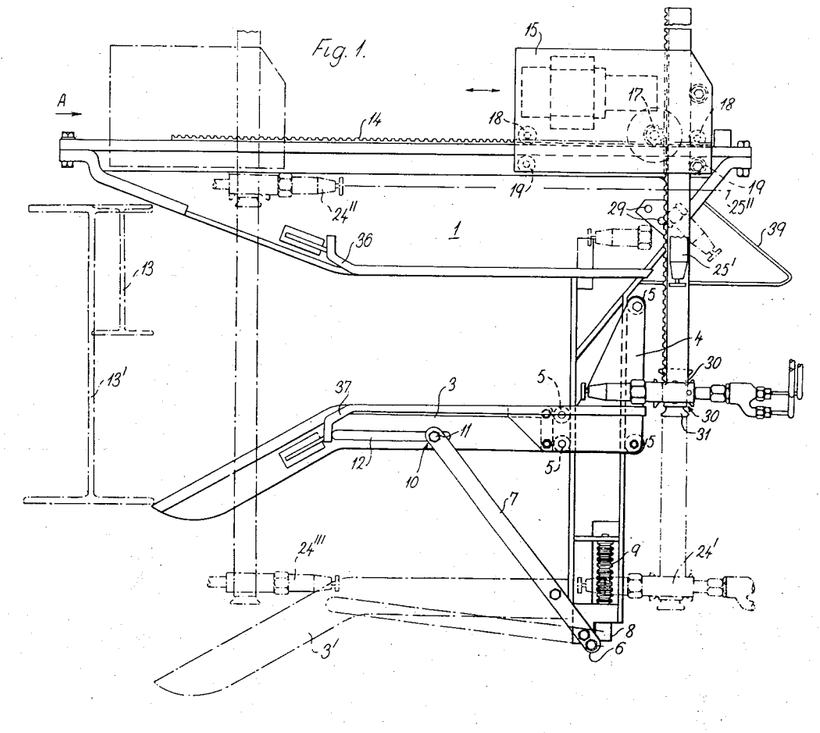
FIG. 1 is a side elevation of an apparatus.
Figure 2:
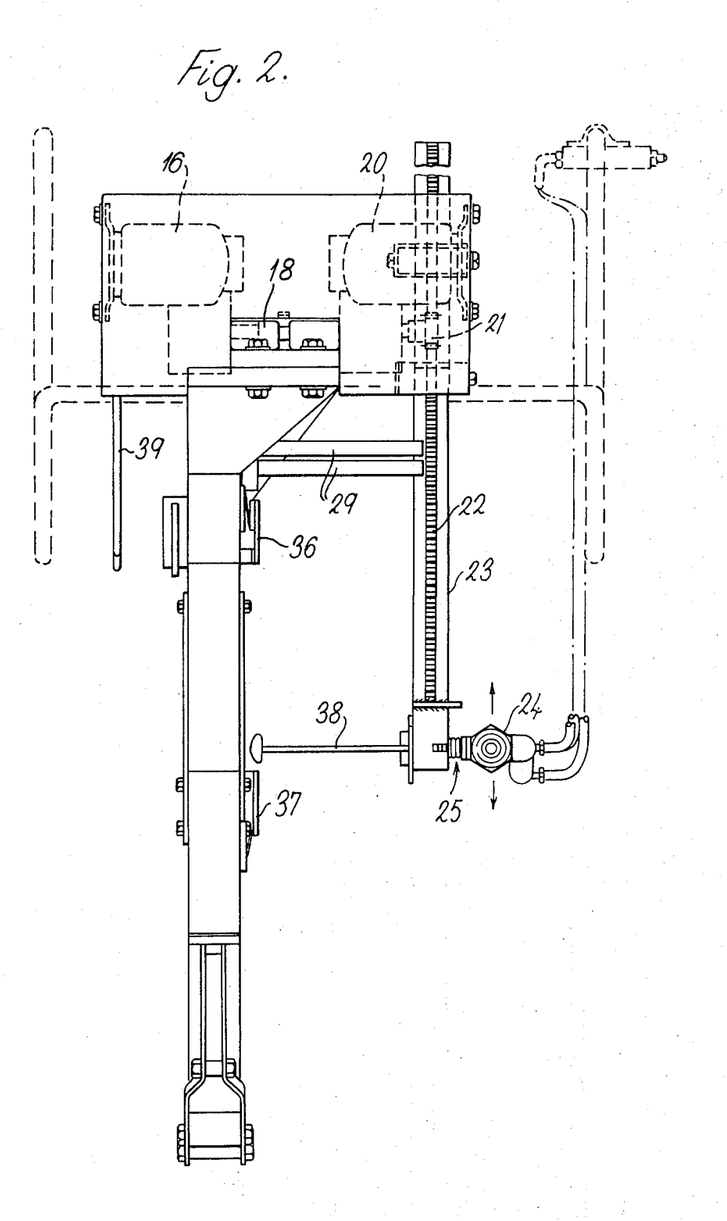
FIG. 2 is an elevation taken in the direction of the arrow A in FIG. 1.

A locating device comprises an upper jaw member 1 integral with a slide member 2 lying at right-angles to it. A lower jaw member 3 carries a bracket 4 and rollers 5 which run on slide 2. One end 6 of a pivotted arm 7 bears against a plunger 8 loaded by a spring 9 mounted on slide 2. The other end 10 of arm 7 carries a pin 11 which runs in a slot 12 in lower jaw 3. The lower jaw is thus spring-loaded to take up its closest possible position relative to the upper jaw; it is shown in this position in full lines in FIGS. 1 and 2. In this position it will just grip a small girder as shown at 13. In its other extreme position, in which it is shown in chain dotted lines at 3', it will grip a large girder as shown at 13'. The essential function of the locating device is that it is capable of being moved into register with the object to be cut by remote control, and that when in register it locates apparatus to object sufficiently positively for a cutting operation to proceed.

Upper jaw 1 carries a rack 14 on which runs a carriage 15 carrying a motor 16 driving a pinion 17 which can drive carriage 15 up and down rack 14. The weight of carriage 15 upon upper jaw 1 is taken not by the pinion but by rollers 18, arranged in pairs with corresponding under-rollers 19.

Carriage 15 also carries a second motor 20 driving a pinion 21 which co-operates with a rack 22 mounted on a shaft 23. A cutter in the form of a cutting torch 24 carries axle 25 which is pivotally mounted in the bottom end of shaft 23. It will be seen from FIG. 2 that torch 24 is offset to one extreme side of the apparatus so that relative movement of rack 14 and motor 16, and rack 22 and motor 20 can cause torch 24 to travel a cutting path so that it may traverse a rectangular area, i.e. so that the cutter may address any point within that area, without fouling the rest of the apparatus. If jaws 1 and 3 are gripping a girder or other member that is to be cut, torch 24 will address that girder a short distance to one side of where it is gripped by the jaws.

To cut a girder such as 13', the normal course will be to light torch 24, adjust the flame for strength and slowly lower rack 22 and shaft 23 by motor 20 until the flame meets the girder. The flame first cuts the top right-hand flange 28, then web 27 and finally the bottom right-hand flange 26 as the shaft and torch travel downwards. Shaft and torch are then raised again by motor 20. The axle 25 then reaches position 25' (FIG. 1) when one of the bars 29, carried by the upper jaw 1, engages with the slots 30 of a Geneva wheel 31 mounted on axle 25. Further ascent of the axle causes the torch to rotate through 90° to point downwards. Motor 16 is now activated to cause carriage 15 to move to the left so that wheel 31 engages the second of bars 29 and rotates a further 90° until torch 24 points in the opposite direction to its original setting. Movement of carriage 15 continues along rack 14 until torch 24 is in position 24''. Motor 20 now causes shaft 23 to descend until torch 24 reaches position 24'''. In the course of this descent the flame cuts the two left-hand flanges 32, 33 and the girder is severed.

Figure 3:
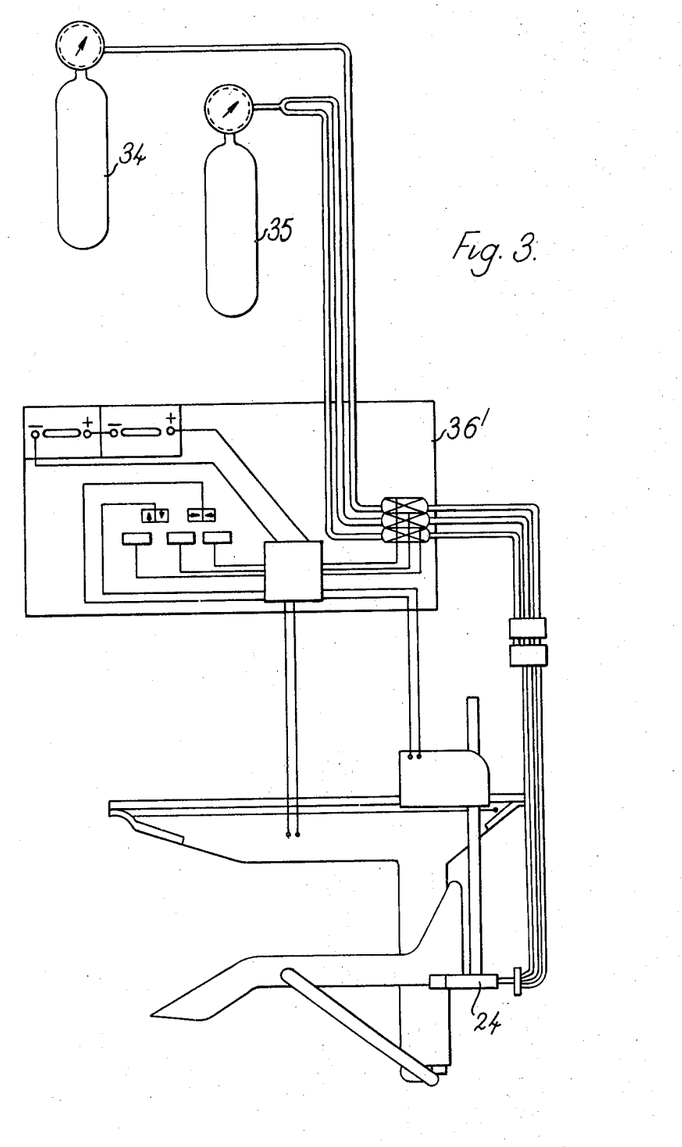
FIG. 3 is a schematic layout of the apparatus showing control devices, fuel supplies etc.
Figure 4:
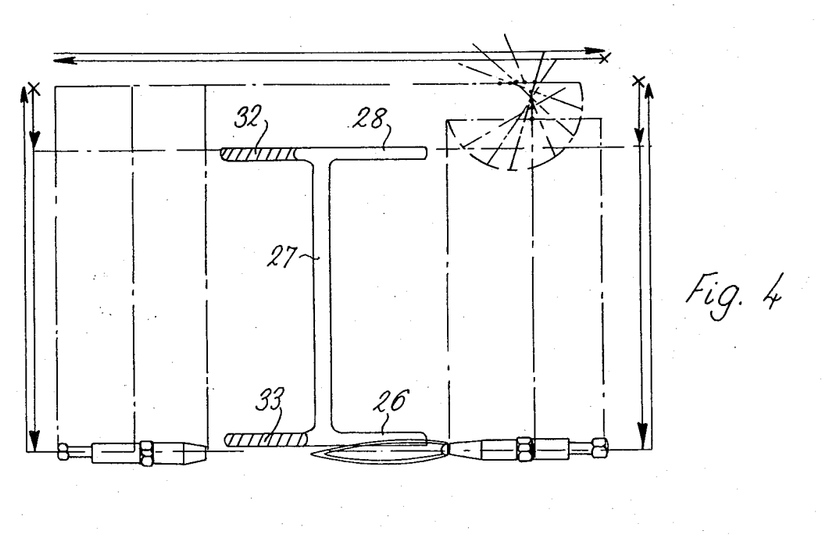
FIG. 4 is a diagrammatic representation of the movements of the tool during a cutting operation.
Figure 5:
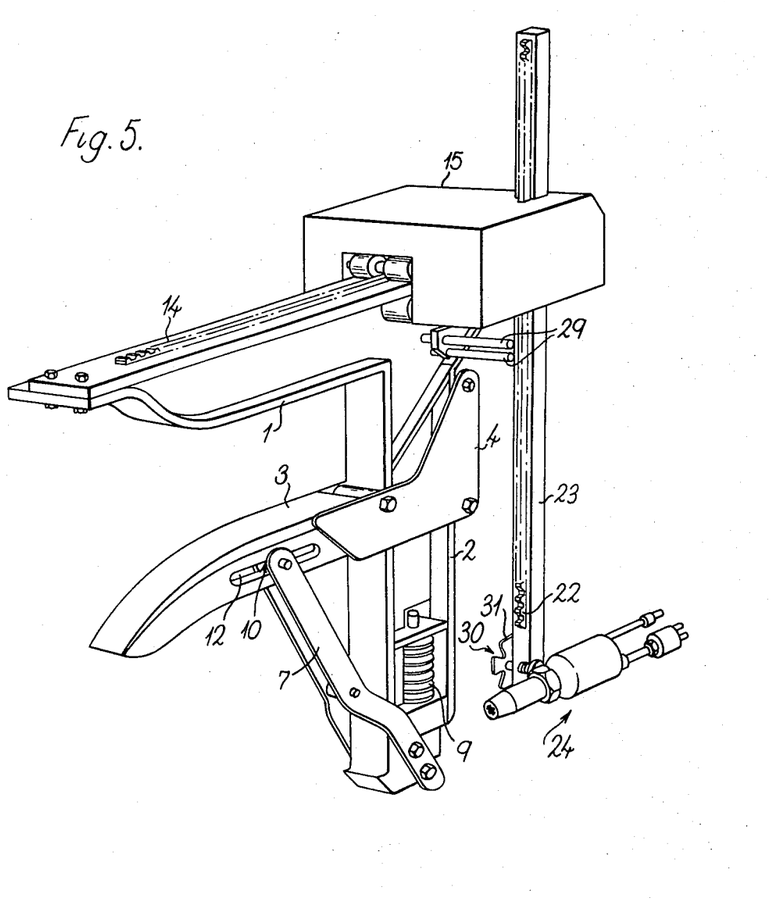
FIG. 5 is a perspective view of the apparatus.

FIG. 3 shows the fuel and oxygen supplies 34 and 35 to torch 24, and represents the control console 36' from which motors 16 and 20 and the state of torch 24 may be controlled. The end settings and correct amount of vertical travel of shaft 23 are controlled by micro switches operated by bars 36, 37 mounted on jaws 1, 3 respectively and tripped by an arm 38 carried by Geneva wheel 31. Correct horizontal travel of carriage 15 along rack 14 is controlled by a spring-loaded width sensor 39 carried by carriage 15.

In operation the jaws are held by a telescopic jib or the like (not shown), are addressed to the girder or other member that is to be cut and are forced over it by the jib so that they open, against the force of spring 9, and grip the top and bottom flanges of the member. The operating devices carried by the locating device are linked by trailing leads to an operator, possibly the driver of the jib, who may remain at a safe distance. It may usually be arranged that the jaws grip the member very close to a wall and cut through it on the side of the jaws remote from that wall. After the cut the jaws are thus left gripping a short but secure stub of the old member, the rest of which is now supported entirely from the opposite end. The jaws may now be pulled off the stub by the jib and relocated close to the wall at the other end of the member. Again the torch cuts through the member on the side of the jaws remote from the wall, and when this cut has proceeded far enough the main central span of the girder will fall, leaving a second wall stub, from which the jaws may again be pulled off by the jib.

Figure 6:
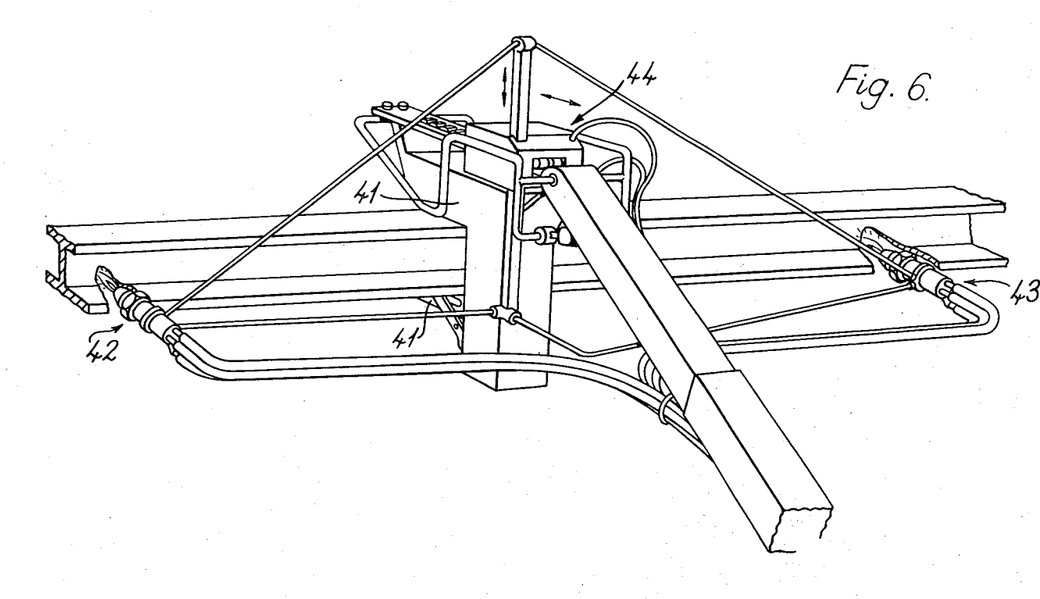
FIG. 6 is a perspective view of a modification of the apparatus.

In the modified apparatus of FIG. 6 the jaws 41 of a locating device similar to that of FIGS. 1 to 5 carry traversing mechanism 44 in which are mounted two torches 42, 43. The mechanism may cause each torch to execute a straight cutting path that will sever the beam by passing up one side of it only provided the flames of the torch are strong enough. The apparatus could of course be developed so that each of torches 42, 43 executed a movement similar to that of torch 24 in FIGS.

1 to 5. In this case, therefore, the jaws will be applied to the middle of a girder and the two torches, by cutting to either side of the jaws, will sever the span of girder which the jaws are actually holding, leaving two stubs each supported by one of the end walls that supported the girder when intact. It may therefore be convenient or necessary that the jib should be strong enough to support the weight of the severed span, and that the grip of the jaws should be strong enough to hold it.

With apparatus of the kind shown in FIG. 6, having two burners one to each side of the locating device that attaches the apparatus to the member that is to be cut, there may sometimes be practical difficulty in devising jaws 41 that are resilient enough to attach themselves to the member when simply pushed against it by the jib, and that then grips the member tightly enough to retain it once it is severed. There may also be practical difficulties in constructing a traversing mechanism 44 accurate and robust enough to control the movements of two distant torches from the centre of the apparatus. In the modified construction of FIG. 7 the jib extremity 50 carries a block 51 carrying a locating device comprising jaws 52, 53 which carry inflatable bags 54, 55. To locate the apparatus upon a girder 56 which is to be cut, the jib 50 moves the apparatus so that the jaws, with bags collapsed, locate over the girder. The bags are now inflated so as to grip the girder; the strength of grip is sufficient in known apparatus of this kind to support the weight of considerable spans of typical metal joists and reinforced concrete beams as used in building.

Block 51 also carries bearings 57 which support telescopic arms 58, adjustable in both length and angular setting. The far ends of arms 58 are received in bearings 59 carried by cutter units 60 very similar to those described with reference to FIGS. 1 to 5; they have vertical racks 61, horizontal racks 62, upper jaws 63, spring loaded lower jaws 64, and cutting torches 65. The control systems for units 60 are not shown in FIG. 7, nor are the angular and telescopic controls for arms 58 nor the inflation controls for bags 54, 55; normally, of course, the controls will be situated at ground level, probably in the cab of the crane that operates jib 50.

When jaws 52, 53 are first addressed to girder 56, arms 58 will usually be retracted and angled backwards so that cutter units 60 do not foul the approach of the jaws to the girder. Once the jaws are located over the girder and bags 54, 55 inflated, arms 58 will be extended so as to separate cutters 65 so that they will sever the desired span of girder. The controls will then be operated to pivot the extended arms 58 within bearings 57 so that jaws 63, 64 are addressed to the girder, yield to receive it, and are then thrust over it so that torches 65 are located correctly relative to the girder to begin cutting operations as already described with reference to FIGS. 1 to 5. Bearings 57, 59 are linked by gearing in known manner to ensure that the two units 60 may move in unison and may maintain parallelism with jaws 52, 53. The controls also ensure, of course, that when cutting of a straight beam is taking place the main locating device of the apparatus (i.e. the jaws 52, 53 with their inflation devices) is aligned with the local location devices (jaws 63, 64) of each of the cutter units 60.

Figure 7:
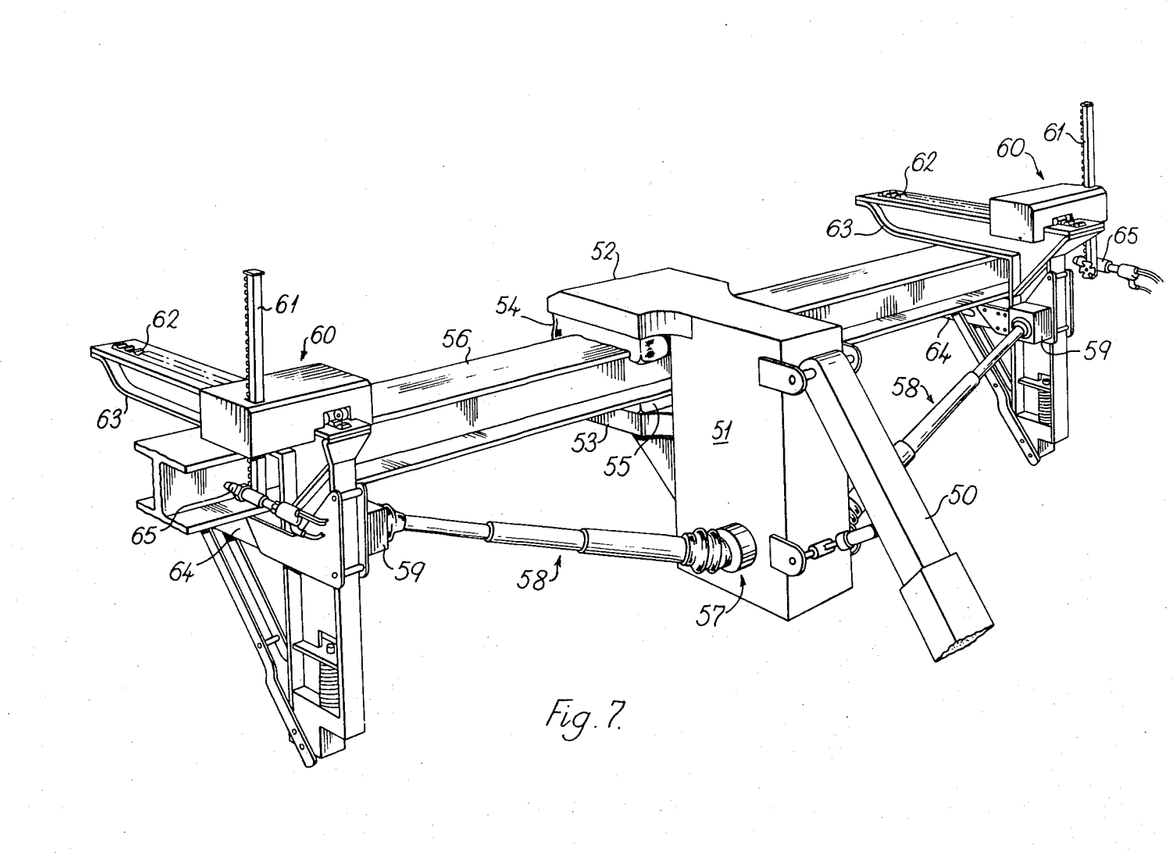
FIG. 7 is a perspective view of another modification.

Cutters 65 each lie to the side of their unit 60 that is remote from central block 51, so when the two cuts are complete the severed length of girder 56 is held and its weight supported by jaws 52, 53. Units 60 may now be withdrawn from the severed length by reverse movement of arms 58, and the severed length lowered by the jib to a point of recovery whilst it was held in the main jaws 52, 53 of the apparatus.

In a further alternative, similar to that just described, a simple overhanging hook or the like could be substituted for jaws 52, 53. These would be sufficient to allow the apparatus to be located on the girder by remote control, after which arms 58 could position units 60 as before. Since this modified apparatus will not be able to support the weight of the girder when severed, the span being cut must be held by a crane or other known lifting gear. When severance is complete, the units 60 may as before be withdrawn by reverse movement of arms 58, and the apparatus may then be lifted by the jib off the severed length, which will then be lowered to the ground by the crane.

Gripping devices such as the spring-loaded jaws of FIGS. 1 to 5 or the jaws with inflatable bags of FIG. 7 could of course be replaced by other locating devices, for instance suction or magnetic devices, provided they are capable of being located, and preferably then tightened, on objects like girders and beams by remote control.

The invention has been described with reference to a torch-type cutter, but is of course applicable to other types as well. FIGS. 1 to 5 of the drawings have also shown traversing mechanism essentially comprising two straight rack drives at right-angles to each other. Other arrangements are possible — for instance the combination of one straight line and one rotary motion to locate the tool - provided the tool can be addressed to any point within at least a two-dimensional space.

I claim:

1. Cutting apparatus including:

a cutting frame;

a jib;

maneuvering means for said jib;

lockable connecting means between said cutting frame and said jib for causing the cutting frame to be positively located by maneuvering of the jib;

said frame comprising resiliently mounted jaws with tapered noses;

said resilient mounting and tapered noses being adapted to allow said jaws to yield, receive and grip an object such as a structural girder to be cut, when moved into contact with it by said maneuvering of said jib and securely connect the frame to said object without need for a person's manual manipulation of the frame or the object and to hold the object after it is severed;

at least one cutter mounted on said frame for cuttingly addressing said object;

drive means for the cutter on the frame for moving the cutter relative to the gripped object for executing a cutting path;

remotely located control means for said drive means;

and control line means operatively interconnecting the cutter drive means and the control means for performing the cutting from a remote location.

2. The cutting apparatus of claim 1 wherein said one cutter is mounted to one side of said jaws and said apparatus includes a second like cutter and drive means therefor mounted to the other side of said jaws, whereby the jaws lie intermediate two cutters so that an object connected at both ends to other material may be addressed and gripped by the jaws and simultaneously severed at both ends from the other material.

3. The cutting apparatus of claim 1 wherein the jaws includes one fixed jaw and one movable jaw biased with respect to the fixed jaw, the fixed jaw being mounted directly to the frame and the movable jaw being indirectly carried by the frame via the fixed jaw;

rack and gear means between the fixed jaw and the frame for moving the frame relatively closer and further from the nose for bringing the cutter closer to and back away from the gripped object.

4. The cutting apparatus of claim 1 including means for suspending the jib from a crane to facilitate use of the cutting apparatus in the disassembly of buildings and the like.

5. The cutting apparatus of claim 1 wherein the drive means are constructed and arranged to selectively move the cutter through a straight path and an arcuate path.

6. The cutting apparatus of claim 1 wherein the drive means are constructed and arranged to move the cutter throughout a path sufficient to cut through the object when the object is a steel H-beam construction girder, without need for repositioning the secure connection of the frame to the object when the cutting has been only partially completed.

* * * * *